United States Patent [19]

Oka et al.

[11] Patent Number: 5,670,608
[45] Date of Patent: Sep. 23, 1997

[54] POLYAMIDE AND POLYAMIDE COMPOSITION

[75] Inventors: Hideaki Oka; Tsugunori Kashimura; Shinichi Yokota; Hiroshi Hayashihara, all of Kurashiki, Japan

[73] Assignee: Kuraray Co., Ltd., Kurashiki, Japan

[21] Appl. No.: 361,371

[22] Filed: Dec. 22, 1994

[30] Foreign Application Priority Data

| Dec. 24, 1993 | [JP] | Japan | 5-328109 |
| Feb. 16, 1994 | [JP] | Japan | 6-019584 |
| Feb. 16, 1994 | [JP] | Japan | 6-019585 |

[51] Int. Cl.$^6$ .......................... C08G 69/26; C08K 3/00; C08L 77/00
[52] U.S. Cl. .......................... 528/322; 528/335; 528/340; 528/347; 528/348; 524/443; 524/444; 524/606; 524/607; 525/432
[58] Field of Search .......................... 524/606, 607, 524/443, 444; 528/340, 347, 348, 335, 322; 525/432

[56] References Cited

U.S. PATENT DOCUMENTS

| 3,639,203 | 2/1972 | Tamura et al. | 161/173 |
| 3,843,591 | 10/1974 | Hedrick et al. | 524/606 |
| 3,904,677 | 9/1975 | Campbell | 528/346 |
| 4,051,087 | 9/1977 | Scoggins et al. | 528/335 |
| 4,086,295 | 4/1978 | Mori et al. | 524/606 |
| 4,187,371 | 2/1980 | Campbell | 528/346 |
| 4,293,688 | 10/1981 | Campbell et al. | 528/310 |
| 4,528,304 | 7/1985 | Yoshimura et al. | 523/216 |
| 4,603,166 | 7/1986 | Poppe et al. | 524/606 |
| 4,607,073 | 8/1986 | Sakashita et al. | 524/404 |
| 4,985,486 | 1/1991 | Westeppe | 524/514 |

FOREIGN PATENT DOCUMENTS 1070416  6/1967  United Kingdom.

OTHER PUBLICATIONS

Abstract of Japanese Patent Application Laid-open No. 296030/Dec. 26, 1986.

*Primary Examiner*—James J. Seidleck
*Assistant Examiner*—P. Hampton-Hightower
*Attorney, Agent, or Firm*—Oblon, Spivak, McClelland, Maier & Neustadt, P.C.

[57] ABSTRACT

A polyamide (9-T polyamide) comprising (a) 60 to 100 mole of terephthalic acid and (b) a diamine component comprising 60 to 100 mole % of 1,9-nonanediamine, said polyamide having an intrinsic viscosity [η] as determined by measurement in concentrated sulfuric acid at 30° C. of 0.6 to 2.0 dl/g and having at least 10% of terminal groups thereof blocked. Another polyamide (9M-T polyamide) comprises a dicarboxylic acid component (a) comprising 60 to 100 mole % of terephthalic acid and a diamine component (b) comprising 60 to 100 mole % of 1,9-nonanediamine and 2-methyl-1,8octanediamine, the molar ratio between said 1,9 nonanediamine and said 2-methyl-1,8-octanediamine being in a range of 60:40 to 99:1, said polyamide having an intrinsic viscosity [η] as determined by measurement in concentrated sulfuric acid at 30° C. of 0.4 to 3.0 dl/g. These polyamides have excellent moldability, as well as excellent hot water resistance, surface neatness, heat resistance, mechanical characteristics, low-water-absorption property and chemical resistance. Polyamide compositions comprising the 9-T polyamide or 9M-T polyamide and a filler are suitably used as engineering plastics.

13 Claims, No Drawings

POLYAMIDE AND POLYAMIDE COMPOSITION

BACKGROUND OF THE INVENTION

1. Field of the Invention

The present invention relates to polyamides having superior moldability and excellent hot water resistance, surface appearance, heat resistance, mechanical characteristics and chemical resistance, as well as low water absorption. The present invention also relates to polyamide compositions suitable for engineering plastics comprising the above polyamides and a filler.

2. Description of the Prior Art

Crystalline polyamides as represented by nylon 6 and nylon 66 have been widely used in fibers for, e.g., clothing and for industrial uses, and as general-purpose engineering plastics. However, these materials exhibit poor heat resistance and poor dimensional stability as caused by water absorption. In particular, it has become difficult to use conventional polyamides in the electric and electronic parts fields which require good flow-solder resistance due in part to the development in recent years of surface mounting techniques, or as car engine parts which require better heat resistance year by year. There has been, therefore, an increasing demand for the development of a polyamide having better resistance, dimensional stability, mechanical characteristics and physical and chemical characteristics.

To meet the above requirements, aliphatic polyamides comprising adipic acid and 1,4-butanediamine, and aromatic polyamides comprising terephthalic acid and 1,6-hexanediamine as main components (hereinafter referred to as 6-T polyamides), have been proposed and partly put into practical use. However, aliphatic polyamides comprising adipic acid and 1 4-butanediamine, having low melt viscosity and hence having good moldability, have the problem of high water absorption which causes fluctuation of dimensional stability during use.

Aromatic polyamides comprising terephthalic acid and 1,6-hexanediamine have a melting point near 370° C., which exceeds the decomposition point of the polymer and hence cannot be melt molded. The aromatic polyamides are therefore currently used after modification to decrease their melting point to about 280°–320° C. by copolymerizing 30–40 mole % of a dicarboxylic acid component such as adipic acid or isophthalic acid or an aliphatic polyamide such as nylon 6. However, copolymerization of such a large amount of a third component (in some cases, further a fourth component), which is effective in decreasing the melting point, also decreases the rate of crystallization and the attainable degree of crystallization, thereby deteriorating the obtainable properties such as rigidity under high temperatures, chemical resistance and dimensional stability and prolonging the molding cycle to decrease productivity. Besides, the fluctuation of properties such as dimensional stability upon water absorption of these polyamides is, although somewhat improved as compared to conventional aliphatic polyamides, still above such a level that can practically solve the outstanding problem.

Japanese Patent Application Laid-open Nos. 53536/1984, 158220/1985, 36459/1987 and 281532/1991 and U.S. Pat. No. 4,607,073, all of which are incorporated herein by reference, describe aliphatic diamines having a longer chain than 1,6-hexanediamine as useful diamine components of aromatic polyamides However, these literature references do not specifically disclose the use of 1,9-nonanediamine and give no suggestion that the use of a diamine having at least 7 carbon atoms provides particularly improved properties as compared to the use of 1,6-hexanediamine.

British Patent 1070416, incorporated herein by reference, discloses production of a polyamide having an inherent viscosity (η inh) of 0.67 to 1.03 dl/g by polycondensation of a nylon salt comprising terephthalic acid and 1,9-nonanediamine in the presence of 3.1 to 4.0 mole %, based on the diamine, of terephthalic acid.

Japanese Patent Application Laid-open No. 155427/1984 and U.S. Pat. No. 4,617,342, both incorporated herein by reference, describe a polyamide comprising terephthalic acid, a linear aliphatic diamine of 1,6-hexamethylenediamine and a branched aliphatic diamine of 2,2,4-(2,4,4-)trimethylhexamethylene-diamine. However, these literature references give no specific disclosure of any polyamide utilizing a linear aliphatic diamine of 1,9-nonanediamine and 2-methyl-1,8-octanediamine in a specific ratio.

According to a study made by the present inventors, polyamides having terminal terephthalic acid residues, obtained by following the procedure described in British Patent 1070416 and comprising terephthalic acid and 1,9-nonanediamine tend to color or foam upon melt molding and giving molded articles having poor surface appearance and hot water resistance. The polyamide described in Japanese Patent Application Laid-open No. 155427/1984 and U.S. Pat. No. 4,617,342, obtained by copolymerizing a polyamide comprising terephthalic acid and 1,6-hexamethylenediamine with a branched aliphatic diamine of 2,2,4-(2,4,4)trimethylhexamethylenediamine has poor rigidity under high temperature, poor chemical resistance and poor dimensional stability upon water absorption.

Accordingly, one object of the present invention is to provide a polyamide comprising an aromatic dicarboxylic acid component and an aliphatic diamine component and having far better moldability as compared to conventional aromatic polyamides and having excellent crystallinity, heat resistance, low water absorption property, chemical resistance and lightweightness, as well as excellent dimensional stability, surface appearance and shock resistance.

Another object of the present invention is to provide a polyamide composition comprising the above polyamide which may suitably be used as an engineering plastic.

SUMMARY OF THE INVENTION

The present invention polyamides comprising terephthalic acid and 1,9-nonanediamine as principal components solve the problems described above, in that they possess excellent moldability, hot water resistance, surface neatness and like properties when the intrinsic viscosity [η] and ratio of blockage of its terminal group have been adjusted within specific ranges. Copolymerization of a polyamide comprising terephthalic acid and 1,9-nonanediamine as principal components with a specific amount of 2-methyl-1,8-octanediamine produces, without impairing the original polyamide's good characteristics, polyamides having still better surface neatness and shock resistance. Polyamide compositions comprising these polyamides and a filler are useful in the field of engineering plastics.

Thus, the present invention provides a polyamide comprising a dicarboxylic acid component (a) comprising 60 to 100 mole % of terephthalic acid and a diamine component (b) comprising 60 to 100 mole % of 1,9-nonanediamine, said polyamide (hereinafter referred to as "9-T polyamide") having an intrinsic viscosity [η] as determined by measurement in concentrated sulfuric acid at 30° C. of 0.6 to 2.0 dl/g and having at least 10% of the terminal groups thereof blocked.

The present invention further provides a polyamide comprising a dicarboxylic acid component (a) comprising 60 to 100 mole % of terephthalic acid and a diamine component (b) comprising 60 to 100 mole % of 1,9-nonanediamine and 2-methyl-1,8-octanediamine, the molar ratio of said 1,9-nonanediamine to said 2-methyl-1,8-octanediamine being in a range of 60:40 to 99:1, said polyamide (hereinafter referred to as "9M-T polyamide") having an intrinsic viscosity [η] as determined by measurement in concentrated sulfuric acid at 30° C. of 0.4 to 3.0 dl/g.

The present invention still further provides a polyamide composition comprising 100 parts by weight of 9-T polyamide or 9M-T polyamide described above and 0.1 to 200 parts by weight of a filler.

With the polyamides of the present invention, within a range of the intrinsic viscosity [η] as determined in concentrated sulfuric acid of 0.4 to 3.0 dl/g, the following relationship (1) holds between the intrinsic viscosity [η] and the melt viscosity (MV) as determined at a rate of shear of 1000 sec$^{-1}$.

$$\log MV = 1.9[\eta] + A \quad (1)$$

where A=a function of temperature.

With preferred examples of the polyamides of the present invention, the A-value at 340° C. is 0.6 to 1.0 and the difference between the A-value at 330° C. and that at 350° C. is 0.1 to 0.6. On the other hand, with conventional 6-T polyamides, having a coefficient of an intrinsic viscosity [η] of about the same level as those of the polyamides of the present invention, the A-value at 340° C. is 1.3 to 1.7 and the difference between the A-value at 330° C. and that at 350° C. is 0.7 to 1.1. Accordingly, in a temperature range of 330 to 350° C., which is preferably used for molding, the polyamides of the present invention, while having the same intrinsic viscosity [η], have a smaller melt viscosity and smaller change in melt viscosity when the molding temperature changes, as compared to conventional 6-T polyamides. The polyamides of the present invention thus have the further advantage of a small change in melt viscosity during residence time upon molding and thus have markedly improved moldability as compared to conventional 6-T polyamides.

The polyamides of the present invention are usable as molding materials for industrial goods and household goods. The polyamide compositions of the present invention are particularly useful as engineering plastics.

DETAILED DESCRIPTION OF THE PREFERRED EMBODIMENTS

The dicarboxylic acid component (a) used for the polyamides of the present invention comprises at least 60 mole %, preferably at least 75 mole %, more preferably at least 90 mole %, including 65, 70, 80 and 85% and all ranges therebetween, of terephthalic acid. If the content of terephthalic acid component is less than 60 mole %, the resulting polyamide will become poor in its heat resistance, chemical resistance and like properties. Examples of useful dicarboxylic acid components other than terephthalic acid include aliphatic dicarboxylic acids, e.g, malonic acid, dimethylmalonic acid, succinic acid, glutaric acid, adipic acid, 2-methyladipic acid, trimethyladipic acid, pimelic acid, 2,2dimethylglutaric acid, 3,3-diethylsuccinic acid, azelaic acid, sebacic acid and suberic acid; alicyclic dicarboxylic acids, e.g., 1,3-cyclopentanedicarboxylic acid and 1,4-cyclohexanedicarboxylic acid; aromatic dicarboxylic acids, e.g., isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, dibenzoic acid, 4,4'oxydibenzoic acid, diphenylmethane-4,4'-dicarboxylic acid, diphenylsulfone-4,4'-dicarboxylic acid and 4,4'-biphenyldicarboxylic acid; and mixtures of any combination of the foregoing. Among the above, aromatic dicarboxylic acids are preferred. Multi-valent carboxylic acids such as trimellitic acid, trimesic acid and pyromellitic acid are also usable within such limits that assure melt molding.

The diamine component (b) used for the 9-T polyamide of the present invention comprises at least 60 mole %, preferably at least 75 mole %, more preferably at least 90 mole %, including 65, 70, 80 and 85% and all ranges therebetween, of 1,9-nonanediamine. The use of at least 60 mole % of 1,9-nonanediamine realizes production of polyamides having excellent heat resistance, moldability, chemical resistance, and having low-water-absorption properties, lightweightness and good mechanical properties.

The diamine component (b) used for the 9M-T polyamide of the present invention comprises at least 60 mole %, preferably at least 75 mole %, more preferably at least 90 mole %, including 65, 70, 80 and 85% and all ranges therebetween, of a total of 1,9-nonanediamine and 2-methyl-1-8-octanediamine. In addition, the molar ratio of the 1,9-nonanediamine component to the 2-methyl-1,8-octanediamine component (1,9):(2-1-8) is 60:40 to 99:1, preferably 70:30 to 95:5, and more preferably 80:20 to 95:5. Copolymerization of, in addition to 1,9-nonanediamine, this amount of 2-methyl-1,8-octanediamine yields polyamides having not only a large melt moldable temperature range and excellent moldability, but also excellent crystallinity and mechanical characteristics, in particular shock resistance.

Examples of useful diamine components other than 1,9-nonanediamine or 2-methyl-1,8-octanediamine in both the 9-T and 9M-T polyamides of the present invention are aliphatic diamines, e.g., ethylenediamine, propylenediamine, 1,4-butanediamine, 1,6-hexanediamine, 1,8-octanediamine, 1,10-decanediamine, 1,12-dodecanediamine, 3-methyl-1,5-pentanediamine, 2,2,4-trimethyl-1,6-hexanediamine, 2,4,4-trimethyl-1,6-hexanediamine and 5-methyl-1,9-nonanediamine; alicyclic diamines, e.g., cyclohexanediamine, methylcyclohexanediamine and isophoronediamine; aromatic diamines, e.g., p-phenylenediamine, m-phenylenediamine, xylenediamine, 4,4'-diaminodiphenylmethane, 4,4'-diaminodiphenylsulfone and 4,4'-diaminodiphenyl ether; and mixtures of the foregoing.

With the 9-T polyamides of the present invention, at least 10% of the terminal groups of the molecular chains is blocked with a terminal-blocking agent. It is desirable that at least 40% of the terminal groups be blocked, and preferably at least 70%, more preferably at least 80% and most preferably at least 90% be blocked, at least 15, 20, 25, 30, 35, 40, 45, 50, 55, 60, 65, 70, 75, 80 and 85% being included as are all ranges therebetween.

With the 9M-T polyamide of the present invention, it is desirable but not required that at least 10% of the terminal groups of the molecular chains be blocked with a terminal blocking agent, and preferably at least 40%, more preferably at least 60% and most preferably that at least 70% be blocked, at least 15, 20, 25, 30, 35, 40 45, 50 65, 60, and 65% being included, as are all ranges therebetween.

The percentage of blockage of terminal groups of a polyamide can be obtained by determining the number of the terminal carboxyl groups, the number of terminal amino groups and the number of terminals blocked with a terminal blocking agent, and then calculating by the formula (4) given later. It is desirable, in view of precision and ease, to obtain the number of each of the terminal groups by subjecting the polyamide to $^1$H-NMR spectroscopy and then calculating the number from the integrated intensity of the characteristic signals corresponding to the various terminal groups. Where, however, the characteristic signal of the terminal group blocked with a terminal blocking agent cannot be identified, the ratio of blockage is obtained as follows. At first, the intrinsic viscosity [η] of the polyamide is determined, and the total number of molecular chain terminal groups is calculated from the intrinsic viscosity value by the following formula (2) for 9-T polyamide or by formula (3) for 9M-T polyamide. Next, the number (eq/g) of terminal carboxyl groups and that (eq/g) of terminal amino groups are determined by titration. The titration for terminal carboxyl groups is conducted on a solution of the polyamide in benzyl alcohol with 0.1N sodium hydroxide and that for terminal amino groups is conducted on a solution of the polyamide in phenol with 0.1N hydrochloric acid. Then the ratio of blockage is calculated by formula (4).

$$\text{Total number of molecular chain terminal groups (eq/g)} = \frac{2}{19700[\eta] - 7900} \quad (2)$$

$$\text{Total number of molecular chain terminal groups (eq/g)} = \frac{2}{21900[\eta] - 7900} \quad (3)$$

$$\text{Ratio of blockage} = [(a - b)/a] \times 100 \quad (4)$$

where a=total number of molecular chain terminal groups (this is generally equal to twice the number of polyamide molecules)

b=total number of terminal carboxyl groups and terminal amino groups.

In the present invention, any monofunctional compound reactable with the amino or carboxyl groups on the terminals of the polyamide molecules may be used as terminal blocking groups, with no particular limitation, but monocarboxylic acids and monoamines, particularly monocarboxylic acids, are preferred in view of reactivity and stability of the blocked terminals. Also usable are acid anhydrides such as phthalic anhydride, monoisocyanates, acid monohalides, monoesters and monoalcohols. Mixtures of these compounds may also be used.

Any monocarboxylic acid can be used as a terminal blocking agent, as long as it is reactable with an amino group. Examples of the monocarboxylic acid are aliphatic monocarboxylic acids, e.g., acetic acid, propionic acid, lactic acid, valeric acid, caproic acid, capric acid, lauric acid, tridecylic acid, myristic acid, palmitic acid, stearic acid, pivalic acid and isobutyric acid; alicyclic acids, e.g., cyclohexanecarboxylic acid; aromatic monocarboxylic acids; e.g., benzoic acid, toluic acid, α-naphthalenecarboxylic acid, β-naphthalenecarboxylic acid, methylnaphthalenecarboxylic acid and phenylacetic acid; and mixtures of the foregoing. Particularly preferred examples among the above in view of reactivity, stability of blocked terminals and price are acetic acid, propionic acid, lactic acid, valeric acid, caproic acid, capric acid, lauric acid, tridecylic acid, myristic acid, palmitic acid, stearic acid and benzoic acid.

The terminal amino groups of the polyamides of the present invention form, when blocked with any one of the above monocarboxylic acids, blocked terminals represented by the following general formula (I).

$$R-\underset{\underset{O}{\|}}{C}- \quad (I)$$

wherein R represents a residue of the monocarboxylic acid from which carboxyl group has been removed and is preferably alkyl, cycloalkyl, aryl or aralkyl.

Any monoamine can be used as a terminal blocking agent in the present invention, as long as it is reactable with carboxylic group. Examples of suitable monoamines are aliphatic monoamines, e.g., methylamine, ethylamine, propylamine, butylamine, hexylamine, octylamine, decylamine, stearylamine, dimethylamine, diethylamine, dipropylamine and dibutylamine; alicyclic amines, e.g., cyclohexylamine and dicyclohexylamine; aromatic monoamines, e.g., aniline, toluidine, diphenylamine and naphthylamine; and mixtures of the foregoing. Particularly preferred examples among the above, in view of reactivity, boiling point, stability of blocked terminals and price, are butylamine, hexylamine, octylamine, decylamine, stearylamine, cyclohexylamine and aniline.

The terminal carboxyl groups of the polyamide of the present invention form, when blocked with any one of the above monoamines, blocked terminals represented by the following general formula $$R^1-\underset{\underset{R^2}{|}}{N}- \quad (II)$$

wherein $R^1$ represents a residue of the monoamine from which amino group has been removed and is preferably alkyl, cycloalkyl, aryl or aralkyl and $R^2$ represents hydrogen atom or a residue of the monoamine from which amino group has been removed and is preferably hydrogen atom, alkyl, cycloalkyl, aryl or aralkyl.

Where a terminal blocking agent is used upon production of the polyamides of the present invention, it is necessary to select the amount of the agent such that the resulting polyamide has an intrinsic viscosity [η] and a ratio of blockage in the ranges specified above for the present invention materials. The amount used will vary depending on the reactivity and boiling point of the terminal blocking agent, reaction apparatus, reaction conditions and the like, but it is generally in a range of 0.1 to 15 mole % based on the total moles of dicarboxylic acid and diamine.

The polyamides of the present invention can be produced by any process known to produce crystalline polyamides. For example, a catalyst together with, as necessary, a terminal blocking agent is added to a diamine and a dicarboxylic acid, to produce a nylon salt; the nylon salt is then formed at a temperature of not more than 280° C. into a prepolymer having an intrinsic viscosity [η] as determined in concentrated sulfuric acid at 30° C. of 0.1 to 0.6 dl/g, which is further subjected to solid phase polymerization or polymerization through a melt extruder, to give a polyamide according to the present invention. If the terminal blocking agent and catalyst are added after the step of producing a nylon salt, there will tend to occur, during polymerization, the problem of inbalance between carboxyl groups and amino groups or formation of crosslinked structure. The intrinsic viscosity [η] of the prepolymer being within the range of 0.1 to 0.6 dl/g assures little inbalance between carboxyl groups and amino groups or little decrease in the rate of polymerization, thereby providing a polyamide having a small distribution of degree of polymerization and excellent properties and moldability. In effecting the last step of polymerization by solid phase polymerization, it is preferably carried out under reduced pressure or in a stream of an inert gas and at a temperature of 180° to 280° C. Then, the polymerization proceeds at a high rate and productivity with suppressed coloring or gelation. In effecting the last step of polymerization through a melt extruder, it is desirable to employ a polymerization temperature of not more than 370° C., which realizes production of a polyamide having suffered almost no degradation.

Examples of catalysts usable for the above purpose are phosphoric acid, phosphorus acid, hypophosphorous acid and salts and esters of the foregoing. Concrete examples of the salts are those of metals, e.g. potassium, sodium, magnesium, vanadium, calcium, zinc, cobalt, manganese, tin, tungsten, germanium, titanium and antimony and ammonium salt, and ethyl ester, isopropyl ester, butyl ester, hexyl ester, isodecyl ester, octadecyl ester, decyl ester, stearyl ester and phenyl ester.

The 9-T polyamide of the present invention has an intrinsic viscosity [η] as determined in concentrated sulfuric acid at 30° C. in a range of 0.6 to 2.0 dl/g. The intrinsic viscosity [η] is preferably in a range of 0.7 to 1.7 dl/g, more preferably in a range of 0.9 to 1.5 dl/g including 0.7, 0.8, 0.9, 1.0, 1.1., 1.2, 1.3, 1.4., 1.5., 1.6, 1.7, 1.8 and 1.9 and all ranges therebetween.

The 9M-T polyamide of the present invention has an intrinsic viscosity [η] as determined in concentrated sulfuric acid at 30° C. in a range of 0.4 to 3.0 dl/g including 0.5, 0.6, 0.7, 0.8, 0.9, 1.0, 1.1., 1.2, 1.3, 1.4, 1.5, 1.6, 1.7, 1.8, 1.9, 2.0, 2.1, 2.2, 2.3, 2.4, 2.5, 2.6, 2.7, 2.8 and 2.9 and all ranges therebetween. The intrinsic viscosity [η] is preferably in a range of 0.6 to 2.0 dl/g, more preferably in a range of 0.8 to 1.6 dl/g. Known fillers having particulate, fibrous or cloth-like shape are usable for the polyamide compositions of the present invention.

Examples of particulate fillers are silica, silica alumina, alumina, titanium oxide, zinc oxide, boron nitride, talc, mica, potassium titanate, calcium silicate, magnesium sulfate, aluminum borate, asbestos, glass beads, carbon black, graphite, molibdenum disulfide and polytetrafluoroethylene. These particulate fillers, having an average particle diameter of 0.1 mμ to 200μ, are generally used and those having one of 1 mμ to 100μ are preferred. The use of these fillers assures that the resulting polyamide compositions give molded articles having improved dimensional stability, mechanical characteristics, heat resistance, chemical and physical characteristics, slidability and the like.

Examples of fibrous fillers are organic fibers, such as fibers from wholly aromatic polyamides or wholly aromatic liquid crystal polyesters, e.g. polyparaphenyleneterephthalamide, polymetaphenyleneterephthalamide, polyparapheneyleneisophthalamide, polymetaphenyleneisophthalamide and polycondensates of diaminodiphenyl ether and terephthalic acid or isophthalic acid; and inorganic fibers, e.g. glass fibers, carbon fibers and boron fibers. The use of these fibrous fillers not only improves the slidability, but also mechanical properties, heat resistance and chemical and physical properties of molded articles obtained from the resulting polyamide compositions. These fibrous fillers, preferably having an average length of 0.05 to 50 mm, are generally used. In particular, those having an average length of 1 to 10 mm are preferred, since the resulting compositions have good moldability and molded articles obtained therefrom have improved slidability, heat resistance and mechanical properties. These fibrous fillers may be processed into cloths or the like before incorporation into the invention polyamides.

The above described fillers may be used in combination of 2 or more. These fillers are incorporated in an amount of preferably 0.1 to 200 parts by weight based on 100 parts by weight of polyamide, more preferably 0.1 to 150 parts by weight and most preferably 0.5 to 100 parts by weight on the same basis. These fillers may be treated with silane couplers or titanium couplers.

The fillers can be added during polycondensation of polyamide, or by dry blending, by melt kneading through an extruder or by like processes.

The polyamide compositions may further contain, as required, stabilizers such as copper compounds; color; UV absorbers; light stabilizers; antioxidants such as hindered phenol-, hindered amine-, phosphorus- or thio-based antioxidants, antistatic agents; flame retardants such as brominated polymers, antimony oxide or metal hydroxides; crystal nucleus agents; plasticizers; lubricants and like additives. These additives can be added during or after polycondensation of the polyamide.

The polyamides and polyamide compositions of the present invention can be molded by injection: blown, extrusion, compression, drawing or stretching, vacuum forming or like molding processes, into molded articles having the desired shape. Thus, they can be formed into shaped articles generally used as engineering plastics, and even into films or fibers, which are suitably used in the fields of industrial materials and household goods.

EXAMPLES

Other features of the invention will become apparent in the course of the following description of exemplary embodiments which are given for illustration of the invention and are not intended to be limiting thereof. In the Examples and Comparative Examples that follow, the following methods are used for the determination of the ratio of terminal blockage, intrinsic viscosity [η] tensile strength and elongation, flexural strength, flexural modulus, heat deflection temperature, impact strength, retention of intrinsic viscosity [η] or tensile strength and elongation after hot water treatment, high-temperature elastic modulus, equilibrium moisture regain, melt viscosity, rate of crystallization, specific gravity, chemical resistance, moldable temperature range and critical PV value.

Ratio of Terminal Blockage

A polyamide sample is tested by $^1$H-NMR spectroscopy (500 MHz, in deuterated trifluoroacetic acid, at 50° C.). The numbers of terminal carboxyl groups, terminal amino groups and blocked terminals are obtained from the integrated intensities of the corresponding characteristic signals. The ratio of terminal blockage is obtained by formula (4) described above. Table 1 shows the chemical shift values of representative signals used for the determination.

TABLE 1

| Terminal group | Chemical shift value of signal |
| --- | --- |
| 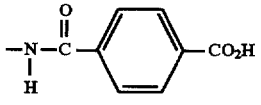 | δ 8.3 ppm |
| 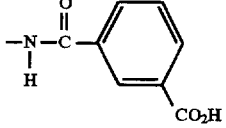 | δ 8.6 ppm |

TABLE 1-continued

| Terminal group | Chemical shift value of signal |
|---|---|
| 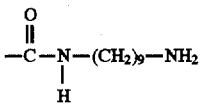 | δ 3.3 ppm |
| 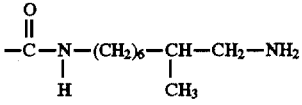 | δ 3.1 ppm |
| 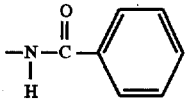 | δ 7.6 ppm |
| 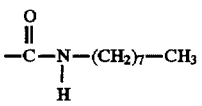 | δ 0.9 ppm |

Intrinsic Viscosity [η]

The inherent viscosity [η inh) of a sample was determined in concentrated sulfuric acid in a concentration of 0.05, 0.1, 0.2 or 0.4 g/dl at 30° C. as follows and the obtained values are 5 extrapolated to obtain a value at a concentration of 0.

$$\eta\ inh=[ln(t_1/t_0)]/c$$

where

η inh=inherent viscosity (dl/g)
$t_0$=flow down time (seconds) of solvent
$t_1$=flow down time (seconds) of sample solution
c=concentration of sample in sample solution

Tensile Strength and Elongation, Flexural Strength, Flexural Modulus, Heat Deflection Temperature and Impact Strength A polyamide sample is injection molded at a temperature about 20° C. higher than the melting point into a specimen. The dry specimen is tested according to the methods given in Table 2.

TABLE 2

| Item | Method | Size of specimen |
|---|---|---|
| Tensile strength | JIS K7113 | JIS No. 1 dumbbell type (thickness: 3 mm) |
| Tensile elongation | " | JIS No. 1 dumbbell type (thickness: 3 mm) |
| Flexural strength | ASTM D790 | 127 × 14 × 6.4 mm |
| Flexural modulus | " | " |
| Impact strength | ASTM D256 | 63.5 × 13 × 3 mm |
| Heat deflection temperature | ASTM D648 (load: 18.6 kg/cm²) | 127 × 14 × 6.4 mm |

Retention of Intrinsic Viscosity [η] or Tensile Strength and Elongation After Hot Water Treatment A JIS No. 1 Dumbbell type injection molded specimen is treated with steam in a pressure-proof autoclave (120° C./2 atmo./120 hours) and then vacuum dried at 120° C. for 120 hours. The specimen having been subjected to this treatment once or twice is tested for intrinsic viscosity [η] and tensile strength and elongation. The retention ratios (%) against the values before the treatment are calculated.

High-Temperature Elastic Modulus

The above molded specimen is tested for flexural modulus at 200° C.

Equilibrium Moisture Regain

A film specimen having a thickness of 200μ (5 cm×5 cm) is prepared from a polyamide sample by heat pressing at a temperature 20° C. higher than the melting point and cooling at 150° C. for 5 minutes. The specimen is dried at 120° C. for 5 days, weighed, immersed in water at 23° C. for 10 days and weighed again. The ratio (%) between the weight increase and the weight before immersion is calculated.

Melt Viscosity and A-Value

A sample having been dried at 120° C. under reduced pressure for 2 days is tested with a flow tester (made by Shimadzu Corp.) for a melt viscosity (MV) under a shear rate of 1000 sec$^{-1}$ at a temperature range of 330° to 350° C. The A-value is obtained by:

$$\log MV=1.9[\eta]+A$$

where

[η]=intrinsic viscosity.

Rate of Crystallization

A differential scanning calorimeter (DSC-30, Mettler Co.) is used. A dry sample is melted at 350° C. in nitrogen stream and then cooled down to 50° C. at a cooling rate of 10° C./min. The crystallization peak appearing during this treatment is taken as the point of crystallization (Tcc). The sample is then heated at a temperature elevation rate of 10° C./min and measured for melting point (Tm). The difference (Tm–Tcc) between the melting point and the crystallization point is taken as the rate of crystallization.

Specific Gravity

Measured with a density gradient tube.

Chemical Resistance

A film sample having a thickness of 200μ prepared by heat pressing at a temperature about 20° C. higher than the melting point is punched with JIS No. 3 Dumbbell to give specimens. The specimens are immersed in various chemicals (methyl alcohol, 10% sulfuric acid, 50% aqueous sodium hydroxide solution and 50% aqueous calcium chloride solution) for 7 days and then tested for tensile strength. The retention ratio against the tensile strength before immersion is calculated for each chemical.

Moldable Temperature Range

A sample is injection molded under the conditions of melt residence time of 5 minutes and die temperature of 150° C. and under various temperature conditions. The lowest at which the molding is still possible and the highest temperature at which the molding is possible but foaming starts due to decomposition are measured.

Critical PV Value

A 3-mm thick injection molded plate specimen is, with a counterpart of a steel plate S45C (#600 sand paper finished), tested under no lubrication condition at an area pressure of 5 kg/cm² and a sliding speed of 50 to 200 cm/sec.

EXAMPLE 1

A 20-liter autoclave was charged with 3272.9 g (19.70 moles) of terephthalic acid, 3165.8 g (20.0 moles) of 1,9-nonanediamine, 73.27 g (0.60 mole) of benzoic acid, 6.5 g (0.1% by weight based on the raw materials) of sodium hypophosphite monohydrate and 6 liters of distilled water and the air in the autoclave was replaced by nitrogen. The contents were stirred at 100° C. for 30 minutes and heated to a temperature of 210° C. over 2 hours. On this heating, the pressure in the autoclave increased to 22 kg/cm². Reaction was allowed to continue for 1 hour, and the temperature was elevated up to 230° C. Reaction was further effected for 2 hours, while the temperature was kept at 230° C. and the pressure was kept at 22 kg/cm² by gradually withdrawing water vapor. Thereafter, the pressure was decreased to 10 kg/cm² over 30 minutes and reaction was further effected for one hour, to obtain a prepolymer having an intrinsic viscosity [η] of 0.25 dl/g. The prepolymer was dried at 100° C. under reduce pressure for 12 hours and then pulverized to a particle size of not more than 2 mm. The particles were subjected to solid phase polymerization at 230° C. under 0.1 mmHg pressure for 10 hours, to give a white polyamide having a melting point of 317° C., an intrinsic viscosity [η] of 1.35 dl/g and a ratio of terminal blockage of 90%.

The polyamide thus obtained was injection molded at a cylinder temperature of 340° C. and a die temperature of 100° C., to give shaped articles. The articles were tested for various properties. The results are shown in Table 3.

EXAMPLE 2

Example 1 was repeated except that the amounts used of terephthalic acid, 1,9-nonanediamine and benzoic acid were changed to 3269.5 g (19.68 moles), 3169.0 (20.02 moles) and 78.16 g (0.64 mole), respectively, to obtain a polyamide and molded specimens therefrom, which were tested for various properties. The results are shown in Table 3.

EXAMPLE 3

Example 1 was repeated except that octylamine was used instead of benzoic acid and that the amounts used of terephthalic acid, 1,9-nonanediamine, octylamine and sodium hypophosphite were set at 3322.7 g (20.0 moles), 3126.2 (19.75 moles), 64.63 g (0.50 mole) and 13.0 g (0.2% by weight based on the raw materials), respectively, to obtain a polyamide and molded specimens therefrom, which were tested for various properties. The results were shown in Table 3.

EXAMPLE 4

Example 1 was repeated except that the amounts used of terephthalic acid and benzoic acid were changed to 3322.7 g (20.0 moles) and 34.19 g (0.28 mole), respectively, to obtain a polyamide and molded specimens therefrom, which were tested for various properties. The results were shown in Table 3.

EXAMPLE 5

Example 1 was repeated except that the amounts used of terephthalic acid and benzoic acid were changed to 3355.9 g (20.2 moles) and 12.21 g (0.10 mole), respectively, to obtain a polyamide and molded specimens therefrom, which were tested for various properties. The results were shown in Table 3.

COMPARATIVE EXAMPLE 1

Example 1 was repeated except that the amounts used of terephthalic acid and benzoic acid were changed to 3073.5 g (18.5 moles) and 366.4 g (3.0 moles), respectively, to obtain a polyamide and molded specimens therefrom, which were tested for various properties. The results are shown in Table 3.

COMPARATIVE EXAMPLE 2

Example 1 was repeated except that benzoic acid and sodium hypophosphite were not used and that the amount used of terephthalic acid was changed to 3372.5 g (20.3 moles), to obtain a polyamide and molded specimens therefrom, which were tested for various properties. The results were shown in Table 3.

TABLE 3

|  | Example 1 | Example 2 | Example 3 | Example 4 | Example 5 | Comp. Ex. 1 | Comp. Ex. 2 |
|---|---|---|---|---|---|---|---|
| Polyamide | 9-T | 9-T | 9-T | 9-T | 9-T | 9-T | 9-T |
| Resin properties |  |  |  |  |  |  |  |
| Ratio of terminal blockage | 90% | 95% | 71% | 44% | 16% | 95% | 0% |
| [η] (dl/g) | 1.35 | 1.31 | 1.30 | 1.37 | 1.38 | 0.51 | 1.42 |
| Difference between A-value at 330° C. and that at 350° C. | 0.3 | 0.3 | 0.3 | 0.3 | 0.3 | 0.4 | 0.3 |
| Difference between A-value at 340° C. on a 3-minute residence and that on 15-minute residence | <0.1 | <0.1 | <0.1 | 0.1 | 0.3 | 0.3 | 0.7 |
| Properties of molded article |  |  |  |  |  |  |  |
| Appearance | Excellent | Excellent | Excellent | Good | Good | Poor[1] | Silver streak[2] |
| Retention after hot water treatment (1st time) of: |  |  |  |  |  |  |  |
| [η] | 98% | 99% | 98% | 87% | 83% | 94% | 79% |
| Tensile strength | 100% | 100% | 100% | 100% | 90% | 67% | 81% |

TABLE 3-continued

|  | Example 1 | Example 2 | Example 3 | Example 4 | Example 5 | Comp. Ex. 1 | Comp. Ex. 2 |
|---|---|---|---|---|---|---|---|
| Tensile elongation | 93% | 96% | 94% | 86% | 75% | 60% | 67% |
| Retention after hot water treatment (2nd time) of: |  |  |  |  |  |  |  |
| [η] | 94% | 95% | 92% | 75% | 68% | 40% | 59% |
| Tensile strength | 95% | 98% | 90% | 82% | 75% | 52% | 51% |
| Tensile elongation | 90% | 92% | 89% | 80% | 61% | 60% | 30% |
| Tensile strength (kg/cm$^2$) | 950 | 970 | 970 | 960 | 960 | 220 | 970 |
| Tensile elongation (%) | 15 | 18 | 17 | 14 | 12 | 0.5 | 12 |
| Flexural strength (kg/cm$^2$) | 1260 | 1270 | 1250 | 1250 | 1260 | 330 | 1250 |
| Flexural modulus (10$^4$ kg/cm$^2$) | 2.6 | 2.6 | 2.6 | 2.5 | 2.6 | 2.8 | 2.6 |
| Impact strength (kg · cm/cm) | 7 | 8 | 8 | 8 | 7 | 1 | 6 |

Notes:
[1)] Marked burrs and recesses
[2)] Streaks on the surface in resin flow direction as caused by gas generating during molding.

EXAMPLE 6

A 20-liter autoclave was charged with 3272.9 g (19.70 moles) of terephthalic acid, 2849.2 g (18.0 moles) of 1,9-nonanediamine, 316.58 g (2.0 moles) of 2-methyl-1,8-octanediamine, 73.27 g (0.60 mole) of benzoic acid, 6.5 g (0.1% by weight based on the raw materials) of sodium hypophosphite monohydrate and 6 liters of distilled water and the air in the autoclave was replaced by nitrogen. The contents were stirred at 100° C. for 30 minutes and heated to a temperature of 210° C. over 2 hours. On this heating, the pressure in the autoclave increased to 22 kg/cm$^2$. Reaction was allowed to continue for 1 hour, and the temperature was elevated up to 230° C. Reaction was further effected for 2 hours, while the temperature was kept at 230° C. and the pressure was kept at 22 kg/cm$^2$ by gradually withdrawing water vapor. Thereafter, the pressure was decreased to 10 kg/cm$^2$ over 30 minutes and reaction was further effected for one hour, to obtain a prepolymer having an intrinsic viscosity [η] of 0.25 dl/g. The prepolymer was dried at 100° C. under reduced pressure for 12 hours and then pulverized to a particle size of not more than 2 mm. The particles were subjected to solid phase polymerization at 230° C. under 0.1 mmHg pressure for 10 hours, to give a white polyamide having a melting point of 310° C., an intrinsic viscosity [η] of 1.26 dl/g and a ratio of terminal blockage of 90%.

The polyamide thus obtained was injection molded at a cylinder temperature of 340° C. and a die temperature of 100° C., to give shaped articles. The articles were tested for various properties. The results are shown in Table 4.

EXAMPLE 7

Example 6 was repeated except that the amounts used of 1,9-nonanediamine and 2-methyl-1,8-octanediamine were changed to 2532.4 g (16.0 moles) and 633.16 g (4.0 moles), respectively, to obtain a polyamide and molded specimens therefrom, which were tested for various properties. The results are shown in Table 4.

EXAMPLE 8

Example 6 was repeated except that the amounts used of 1,9-nonanediamine and 2-methyl-1,8-octanediamine were changed to 2216.1 g (14.0 moles) and 949.74 g (6.0 moles), respectively, to obtain a polyamide and molded specimens therefrom, which were tested for various properties. The results are shown in Table 4.

COMPARATIVE EXAMPLE 3

Example 6 was repeated except that 2-methyl-1,8-octanediamine, benzoic acid and sodium hypophosphite were not used and that the amounts used of terephthalic acid and 1,9-nonanediamine and were changed to 3389.2 g (20.4 moles) and 3165.8 g (20.0 moles), respectively, to obtain a polyamide and molded specimens therefrom, which were tested for various properties. The results are shown in Table 4.

TABLE 4

|  | Example 6 | Example 7 | Example 8 | Comp. Ex. 3 |
|---|---|---|---|---|
| Polamide (MODA/NMDA)[1)] | 10/90 | 20/80 | 30/70 | 0/100 |
| Resin properties |  |  |  |  |
| Melting point (°C.) | 310 | 302 | 283 | 317 |
| Ratio of terminal blockage | 90% | 92% | 89% | 0% |
| [η] (dl/g) | 1.26 | 1.25 | 1.21 | 1.22 |
| Melt viscosity[2)] | 1250 | 1220 | 1200 | 2100 |
| Difference between A-value at 330° C. and that at 350° C. | 0.3 | 0.3 | 0.3 | 0.4 |
| Difference between A-value at 340° C. on 3-minute residence and that on 15-minute residence | <0.1 | <0.1 | <0.1 | 0.7 |
| Moldable temperature range (°C.) | 30 | 40 | 65 | 20 |

TABLE 4-continued

|  | Example 6 | Example 7 | Example 8 | Comp. Ex. 3 |
|---|---|---|---|---|
| Properties of molded article Appearance |  |  |  |  |
| Surface luster | Excellent | Excellent | Excellent | Poor |
| Flow mark | none | none | none | some |
| Retention after hot water treatment of [η] | 98% | 96% | 90% | 78% |
| Tensile strength (kg/cm$^2$) | 970 | 960 | 950 | 930 |
| Tensile elongation (%) | 18 | 20 | 19 | 7 |
| Impact strength (kg · cm/cm) | 9 | 9 | 10 | 5 |

Notes:
[1)]NMDA: 1,9-nonanediamine, MODA: 2-methyl-1,8-octanediamine
[2)]340° C., 1000 sec$^{-1}$

EXAMPLE 9

Example 6 was repeated except that the amounts used of terephthalic acid and benzoic acid were changed to 3223.0 g (19.4 moles) and 146.6 g (1.2 moles), respectively, to obtain a polyamide and molded specimens therefrom, which were tested for various properties. The results are shown in Table 5.

EXAMPLE 10

Example 6 was repeated except that octylamine was used instead of benzoic acid and that the amounts used of terephthalic acid, 1,9-nonanediamine, 2-methyl-1,8-octanediamine, octylamine and sodium hypophosphite were set at 3322.7 g (20.0 moles), 2813.6 (17.775 moles), 312.6 g (1.975 moles), 64.63 g (0.50 mole) and 13.0 g (0.2% by weight based on the raw materials), respectively, to obtain a polyamide and molded specimens therefrom, which were tested for various properties. The results are shown in Table 5.

EXAMPLE 11

Example 6 was repeated except that the amounts used of terephthalic acid and benzoic acid were changed to 3322.7 g (20.0 moles) and 34.19 g (0.28 moles), respectively, to obtain a polyamide and molded specimens therefrom, which were tested for various properties. The results were shown in Table 5.

EXAMPLE 12

Example 6 was repeated except that the amounts used of terephthalic acid and benzoic acid were changed to 3355.9 g (20.2 moles) and 12.21 g (0.10 mole), respectively, to obtain a polyamide and molded specimens therefrom, which were tested for various properties. The results are shown in Table 5.

COMPARATIVE EXAMPLE 4

Example 6 was repeated except that benzoic acid was not used and that the amount used of terephthalic acid was changed to 3738.0 g (22.5 moles), to obtain a polyamide and molded specimens therefrom, which were tested for various properties. The results are shown in Table 5.

TABLE 5

|  | Example 6 | Example 9 | Example 10 | Example 11 | Example 12 | Comp. Ex. 4 |
|---|---|---|---|---|---|---|
| Polamide (MODA/NMDA)[1)] | 10/90 | 10/90 | 10/90 | 10/90 | 10/90 | 10/90 |
| Resin properties |  |  |  |  |  |  |
| Ratio of terminal blockage | 90% | 91% | 71% | 48% | 18% | 0% |
| [η] (dl/g) | 1.26 | 0.80 | 1.22 | 1.27 | 1.29 | 0.35 |
| Difference between A-value at 330° C. and that at 350° C. | 0.3 | 0.3 | 0.3 | 0.4 | 0.4 | 0.7 |
| Difference between A-value at 340° C. on 3-minute residence and that on 15-minute residence | <0.1 | <0.1 | <0.1 | 0.2 | 0.3 | 0.6 |
| Properties of molded article |  |  |  |  |  |  |
| Appearance | Excellent | Excellent | Excellent | Good | Good | Burrs, recesses and voids |
| Tensile strength (kg/cm$^2$) | 970 | 960 | 960 | 960 | 970 | 150 |
| Tensile elongation (%) | 18 | 14 | 17 | 17 | 14 | 0.5 |
| Flexural strength (kg/cm$^2$) | 1220 | 1240 | 1210 | 1200 | 1240 | 220 |
| Flexural modulus (10$^4$ kg/cm$^2$) | 2.5 | 2.6 | 2.5 | 2.3 | 2.5 | 1.3 |
| Impact strength (kg · cm/cm) | 9 | 8 | 8 | 9 | 8 | 1 |

TABLE 5-continued

|  | Example 6 | Example 9 | Example 10 | Example 11 | Example 12 | Comp. Ex. 4 |
|---|---|---|---|---|---|---|
| Retention after hot water treatment of: |  |  |  |  |  |  |
| [η] | 98% | 98% | 96% | 90% | 81% | 52% |
| Tensile strength | 99% | 99% | 98% | 92% | 65% | 40% |

Notes:
[1])NMDA: 1,9-nonanediamine, MODA: 2-methyl-1,8-octanediamine

COMPARATIVE EXAMPLE 5

Example 1 was repeated except that there were used as raw materials 2325.9 g (14.0 moles) of terephthalic acid, 996.8 g (6.0 moles) of isophthalic acid, 2324.2 g (20.0 moles) of 1,6-hexanediamine and 24.43 g (0.20 mole) of benzoic acid, to obtain a polyamide and molded specimens therefrom, which were tested for various properties. The results are, together with those of Examples 1 and 6, shown in Table 6.

TABLE 6

|  | Example 1 | Example 6 | Comp. Ex. 5 |
|---|---|---|---|
| Composition of polyamide | 9-T | 9M-T MODA/NMDA = 10/90 | 6-IT IA/TA = 30/70 |
| Resin properties |  |  |  |
| Ratio of terminal blockage | 90% | 90% | 45% |
| [η] (dl/g) | 1.35 | 1.26 | 1.0 |
| Difference between A-value at 330° C. and that at 350° C. | 0.3 | 0.3 | 0.9 |
| Difference between A-value at 340° C. on 3-minute residence and that on 15-minute residence | <0.1 | <0.1 | 0.3 |
| Moldable temperature range (°C.) | 23 | 30 | 15 |
| Properties of molded article |  |  |  |
| Color | White | White | Pale yellow |
| Appearance | Excellent | Excellent | Poor* |
| Specific gravity | 1.14 | 1.14 | 1.20 |
| Equilibrium moisture regain (%) | 3.0 | 3.0 | 6.7 |
| Retention ratio after hot water treatment of [η] | 98% | 98% | 80% |
| Chemical resistance |  |  |  |
| Methyl alcohol | 72 | 69 | 35 |
| 10% sulfuric acid | 81 | 82 | 50 |
| 50% sodium hydroxide | 85 | 80 | 65 |
| 50% calcium chloride | 92 | 89 | 60 |
| Rate of crystallization (°C.) | 38 | 44 | 54 |
| Tensile elongation (%) | 15 | 18 | 5 |
| Impact strength (kg · cm/cm) | 7 | 9 | 2 |
| Heat deflection temperature (°C.) 18.6 kg/cm² | 144 | 143 | 123 |
| High-temperature modulus (200° C., kg/cm²) | 4500 | 4450 | 1700 |

Notes:
Abbreviations NMDA: 1,9-nonanediamine, MODA: 2-methyl-1,8-octanediamine, TA: terephthalic acid, IA: isophthalic acid
*: Silver streaks generated.

EXAMPLE 13

Example 1 was repeated except that the amounts used of terephthalic acid and benzoic acid were changed to 3239.6 g (19.5 moles) and 122.1 g (1.0 mole), respectively, to obtain a polyamide.

The polyamide thus obtained was dried at 120° C. under reduced pressure for 24 hours and then dry blended with glass fibers (PPG3540, made by PPG) having an average length of 3 mm. The blend was melt kneaded through a single-screw extruder (screw diameter: 40 mm, L/D=28, cylinder temperature: 320° to 350° C., number of rotations: 60 rpm), to give a polyamide composition. The polyamide composition was injection molded at a cylinder temperature of 340° C. and a die temperature of 100° C., to give shaped articles. The articles were tested for various properties. The results are shown in Table 7.

EXAMPLE 14

A polyamide composition was obtained in the same manner as in Example 13 by using the polyamide obtained in Example 2. The polyamide composition was processed into molded articles in the same manner as in Example 13, which were tested for various properties. The results were shown in Table 7.

EXAMPLE 15

Example 6 was repeated except that the amounts used of terephthalic acid, 1,9-nonanediamine, 2-methyl-1,8-octanediamine and benzoic acid were changed to 3256.2 g (19.6 moles), 2849.2 g (18.0 moles), 316.58 g (2.0 moles) and 97.7 g (0.8 mole), respectively, to obtain a polyamide. The polyamide was processed into a polyamide composition and molded articles in the same manner as in Example 13, which were tested for various properties. The results are shown in Table 7.

EXAMPLE 16

Example 15 was repeated except that carbon fibers (TOO8A, made by Toray Industries, Inc.) having an average length of 3 mm was used instead of the glass fibers, to obtain a polyamide composition and molded specimens therefrom, which were tested for various properties. The results are shown in Table 7.

EXAMPLE 17

Example 13 was repeated except that silica alumina (TRANSLINK 555, made by Engelhard Exceptional Technologies) having an average particle diameter of 0.8 g was used instead of the glass fibers, to obtain a polyamide composition and molded specimens therefrom, which were tested for various properties. The results are shown in Table 7.

EXAMPLE 18

Example 13 was repeated except that a mixture of talc (PK-50, made by Maruo Calcium Co.) having an average particle diameter of 5μ and glass fibers (PPG3540, made by PPG) having an average length of 3 mm was used instead of the glass fibers alone, to obtain a polyamide composition and molded specimens therefrom, which were tested for various properties. The results are shown in Table 7.

EXAMPLE 19

Example 15 was repeated except that a mixture of glass beads (GB731a, made by Toshiba Barotini Co.) having an average particle diameter of 30μ and glass fibers (PPG3540, made by PPG) having an average length of 3 mm was used instead of the glass fibers alone, to obtain a polyamide composition and molded specimens therefrom, which were tested for various properties. The results are shown in Table 7.

COMPARATIVE EXAMPLE 6

Example 1 was repeated except that there were used as raw materials 2325.9 g (14.0 moles) of terephthalic acid, 996.8 g (6.0 moles) of isophthalic acid, 2324.2 g (20.0 moles) of 1,6-hexanediamine and 24.43 g (0.20 mole) of benzoic acid, to obtain a polyamide. The polyamide was processed into a polyamide composition and further into molded articles in the same manner as in Example 13, which were tested for various properties. The results are shown in Table 7.

This application is based on Japanese Application Nos. 328109/1993, 19584/1994 and 19585/1994, all incorporated herein by reference. Obviously, numerous modifications and variations are possible in light of the above teachings. It is therefore understood that within the scope of appended claims, the invention may be practiced otherwise than as specifically described herein.

TABLE 7

| | Example 13 | Example 14 | Example 15 | Example 16 | Example 17 | Example 18 | Example 19 | Comp. Ex. 6 |
|---|---|---|---|---|---|---|---|---|
| Composition of polyamide | 9-T | 9-T | 9M-T | 9M-T | 9-T | 9-T | 9M-T | 6-IT |
| MODA/NMDA | 0/100 | 0/100 | 10/90 | 10/90 | 0/100 | 0/100 | 10/90 | — |
| IA/TA | 0/100 | 0/100 | 0/100 | 0/100 | 0/100 | 0/100 | 0/100 | 30/70 |
| Polyamide | | | | | | | | |
| [η] (dl/g) | 1.01 | 1.31 | 1.10 | 1.10 | 1.01 | 1.01 | 1.10 | 1.02 |
| Ratio of terminal blockage | 90 | 95 | 85 | 85 | 90 | 90 | 85 | 45 |
| Filler (parts by weigth based on 100 parts by weight of polymer) | G.F. (43) | G.F. (43) | G.F. (43) | C.F. (43) | Silica alumina (43) | G.F. (50) Talc (17) | G.F. (45) G.B. (5) | G.F. (43) |
| Properties of resin composition | | | | | | | | |
| Tensile strength (kg/cm$^2$) | 2300 | 2280 | 2260 | 2450 | 1150 | 2100 | 2130 | 2030 |
| Tensile elongation (%) | 4 | 5 | 5 | 4 | 2 | 4 | 4 | 3 |
| Impact strength (kg · cm/cm) | 10 | 12 | 12 | 10 | 4 | 10 | 10 | 5 |
| High-temperature modulus (200° C., kg/cm$^2$) | 25000 | 25000 | 24000 | 30000 | 14000 | 28000 | 26000 | 14000 |
| Critical PV value (kg/cm$^2$ · cm/sec) | >1000 | >1000 | >1000 | >1000 | >1000 | >1000 | >1000 | 550 |
| Equilibrium moisture regain (%) | 1.8 | 1.8 | 1.8 | 1.6 | 1.2 | 1.4 | 1.5 | 4.5 |
| Retention of tensile strength after hot water treatment (%) | 100 | 100 | 100 | 100 | 100 | 100 | 100 | 85 |
| Chemical resistance (%) | | | | | | | | |
| Methyl alcohol | 95 | 95 | 93 | 97 | 93 | 97 | 95 | 40 |
| 10% sulfuric acid | 97 | 95 | 95 | 97 | 97 | 100 | 97 | 85 |
| 50% sodium hydroxide | 95 | 95 | 97 | 95 | 97 | 97 | 95 | 77 |
| 50% calcium chloride | 97 | 100 | 97 | 97 | 95 | 100 | 95 | 87 |

Abbreviations
NMDA: 1,9-nonanediamine, MODA: 2-methyl-1,8-octanediamine, TA: terephthalic acid, IA: isophthalic acid, G.F.: glass fiber, C.F.: carbon fiber, G.B.: glass beads

What is claimed as new and is desired to be secured by Letters Patent of the United States is:

1. A polyamide comprising (a) a dicarboxylic acid component comprising 60 to 100 mole % of terephthalic acid and (b) a diamine component comprising 60 to 100 mole % of 1,9-nonanediamine, said polyamide having an intrinsic viscosity [η] as determined by measurement in concentrated sulfuric acid at 30° C. of 0.6 to 2.0 dl/g and having at least 10% of terminal groups thereof blocked.

2. The polyamide according to claim 1, wherein 60 to 100 mole % of said diamine component comprises both 1,9-nonanediamine and 2-methyl-1,8-octanediamine, the molar ratio of said 1,9-nonanediamine to said 2-methyl-1,8-octanediamine being in a range of 60:40 to 99:1.

3. A polyamide comprising (a) a dicarboxylic acid component comprising 60 to 100 mole % of terephthalic acid and (b) a diamine component comprising 60 to 100 mole % of 1,9-nonanediamine, said polyamide having an intrinsic viscosity as determined by measurement in concentrated sulfuric acid at 30° C. of 0.6 to 2.0 dl/g and having at least 70% of terminal groups thereof blocked.

4. A polyamide having terminal groups, comprising a dicarboxylic acid component (a) comprising 60 to 100 mole % of terephthalic acid and (b) a diamine component comprising 60 to 100 mole % of 1,9-nonanediamine and 2-methyl-1,8-octanediamine, the molar ratio between said 1,9-nonanediamine and said 2-methyl-1,8-octanediamine being in a range of 60:40 to 99:1, said polyamide having an intrinsic viscosity [η] as determined by measurement in concentrated sulfuric acid at 30° C. of 0.4 to 3.0 dl/g, and having at least 10% of said terminal groups thereof blocked.

5. The polyamide according to claim 4, having an intrinsic viscosity [η] as determined by measurement in concentrated sulfuric acid at 30° C. of 0.6 to 2.0 dl/g.

6. The polyamide according to either claim 4 or claim 5, having at least 40% of terminal groups thereof blocked.

7. The polyamide according to either claim 4 or claim 5, having at least 70% of terminal groups thereof blocked.

8. A polyamide composition comprising 100 parts by weight of the polyamide according to any one of claim 1 or claim 4 and 0.1 to 200 parts by weight of a filler.

9. The polyamide composition according to claim 8, wherein said filler is a particulate filler having an average particle diameter of 0.1 mμ to 200μ.

10. The polyamide composition according to claim 9, wherein said filler is selected from the group consisting of silica, silica alumina, alumina, titanium oxide, zinc oxide, boron nitride, talc, mica, potassium titanate, calcium silicate, magnesium sulfate, aluminum borate, asbestos, glass beads, carbon black, graphite, molibdenum disulfide and polytetrafluoroethylene.

11. The polyamide composition according to claim 8, wherein said filler is a fibrous filler having an average length of 0.05 to 50 mm.

12. The polyamide composition according to claim 11, wherein said fibrous filler is selected from the group consisting of glass fiber, wholly aromatic polyamide fibers, wholly aromatic liquid crystal polyester fibers, carbon fiber and boron fiber.

13. A polyamide composition comprising 100 parts by weight of the polyamide according to claim 3 and 0.1 to 200 parts by weight of a filler.

* * * * *